(12) United States Patent
Yoneuchi et al.

(10) Patent No.: US 10,915,582 B2
(45) Date of Patent: Feb. 9, 2021

(54) COMPREHENSIVE HOMOGRAPHIC STRING DETECTION BY MAPPING SIMILAR CHARACTERS INTO IDENTIFIERS TO DETERMINE HOMOGRAPHIC STRINGS FROM QUERIED STRINGS

(71) Applicant: International Business Machines Corporation, Armonk, NY (US)

(72) Inventors: Takashi Yoneuchi, Tokyo (JP); Yuji Watanabe, Tokyo (JP); Fumiko Akiyama, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 29 days.

(21) Appl. No.: 16/171,636

(22) Filed: Oct. 26, 2018

(65) Prior Publication Data
US 2020/0134102 A1 Apr. 30, 2020

(51) Int. Cl.
*G06F 16/903* (2019.01)
*H04L 29/12* (2006.01)
(Continued)

(52) U.S. Cl.
CPC ...... *G06F 16/90344* (2019.01); *G06F 16/955* (2019.01); *H04L 61/2046* (2013.01); *H04L 61/3035* (2013.01); *H04L 67/02* (2013.01)

(58) Field of Classification Search
CPC ...... G06F 13/00; G06F 16/903; G06F 16/955; G06F 16/9566; G06F 16/90344;
(Continued)

(56) References Cited

U.S. PATENT DOCUMENTS 5,946,648 A * 8/1999 Halstead, Jr. ......... G06F 40/253
704/9
5,963,893 A * 10/1999 Halstead, Jr. ......... G06F 40/268
704/9
(Continued)

OTHER PUBLICATIONS

Davis et al., "Unicode Security Mechanisms," The Unicode Consortium, Unicode Technical Report 39, May 2018, Unicode, Inc., 25 pages. http://www.unicode.org/unicode/reports/tr39/.
(Continued)

*Primary Examiner* — Robert B Harrell
(74) *Attorney, Agent, or Firm* — Amin, Turocy & Watson, LLP (57) ABSTRACT

Computer systems, computer-implemented methods and computer program products that detect a homographic string against defined strings is disclosed. In one embodiment, a computer-implemented method comprises: preparing, by a device operatively coupled to a processor, a mapping function to map a character into an identifier, the mapping function defining a plurality of groups each comprising two or more characters that resemble one another assigned a same identifier, and wherein the plurality of groups are mutually exclusive; preparing, by the device, a list of identifier sequences obtained from defined strings based on the mapping function; applying, by the device, the mapping function to a queried string to obtain a queried identifier sequence; and determining, by the device, whether the queried string is a homographic string by comparing the queried identifier sequence with the list of the identifier sequences.

22 Claims, 8 Drawing Sheets

(51) Int. Cl.
*H04L 29/08* (2006.01)
*G06F 16/955* (2019.01)

(58) Field of Classification Search
CPC ......... H04L 29/06; H04L 29/08; H04L 29/12; H04L 29/08072; H04L 29/12009; H04L 29/12066; H04L 61/02; H04L 61/1511; H04L 61/2046; H04L 61/3035; H04L 67/00
USPC .......................................... 209/245; 709/245
See application file for complete search history.

(56) References Cited

U.S. PATENT DOCUMENTS

| | | | | |
|---|---|---|---|---|
| 2004/0044791 | A1* | 3/2004 | Pouzzner | G06F 16/9566 709/245 |
| 2006/0031579 | A1* | 2/2006 | Tout | H04L 29/12018 709/245 |
| 2007/0131865 | A1* | 6/2007 | Lawrence | G06F 21/554 250/363.1 |
| 2007/0239865 | A1* | 10/2007 | Tout | H04L 29/12018 709/223 |
| 2014/0115704 | A1 | 4/2014 | Miller | |
| 2016/0127389 | A1 | 5/2016 | Hunt et al. | |
| 2017/0063393 | A1* | 3/2017 | Shelton | H03M 11/20 |
| 2017/0078321 | A1* | 3/2017 | Maylor | H04L 63/1433 |
| 2017/0180378 | A1* | 6/2017 | Tyler | H04L 63/1433 |
| 2017/0195310 | A1* | 7/2017 | Tyler | H04L 63/083 |
| 2017/0318049 | A1* | 11/2017 | Maylor | H04L 63/1433 |
| 2018/0034802 | A1* | 2/2018 | Shelton | G06F 3/04886 |
| 2018/0183828 | A1 | 6/2018 | Oberheide | |

OTHER PUBLICATIONS

Abawajy et al., "Securing Websites Against Homograph Attacks," Security and Privacy in Communication Networks, 2018, pp. 47-59, Springer, 6 pages.

Elsayed et al., "Large Scale Detection of IDN Domain Name Masquerading," APWG Symposium on Electronic Crime Research (eCrime), 2018, IEEE, 11 pages.

"IDN in Google Chrome," The Chromium Projects, Retreived on Aug. 29, 2018, 4 pages. https://www.chromium.org/developers/design-documents/idn-in-google-chrome.

Anonymous, "Method and system to prevent International Domain Name homograph attack," IPCOM000193756D, Mar. 9, 2010, 2 pages. https://ip.com/IPCOM/000193756.

Yoneuchi et al., "Eliminating Confusion: Centralized Homograph Attack Detection in Early Stage of Emergence," 2018, 14 pages.

* cited by examiner

FIG. 5 example.com
U+0065
Latin Small Letter E

éxample.com
U+00E9
Latin Small Letter E with Acute

FIG. 6A

FAMOUSCOMPANY.XYZ
U+004F
Latin Capital Letter O

FAM0USCOMPANY.XYZ
U+0030
Digit Zero

FIG. 6B famouscompany.xyz
U+006F
Latin Small Letter O famouscompany.xyz
U+043E
Cyrillic Small Letter O

FIG. 6C

ハ\ロ—.xyz
U+30ED
Katakana Letter Ro

ハ\ロ—.xyz
U+53E3
Chinese, Japanese, Korean (cjk) unified ideograph "口"

COMPREHENSIVE HOMOGRAPHIC STRING DETECTION BY MAPPING SIMILAR CHARACTERS INTO IDENTIFIERS TO DETERMINE HOMOGRAPHIC STRINGS FROM QUERIED STRINGS

TECHNICAL FIELD

One or more embodiments relate generally to detection technology of homographic strings and, more particularly, to detection of a homographic string and a building of a mapping function for detection of a homographic string.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can facilitate detection of a homographic string and a building of a mapping function for detection of a homographic string are described.

According to an embodiment, a computer-implemented method is provided. The computer-implemented method can comprise: preparing, by a device operatively coupled to a processor, a mapping function to map a character into an identifier, the mapping function defining a plurality of groups each comprising two or more characters that resemble one another assigned a same identifier, and wherein the plurality of groups are mutually exclusive; and preparing, by the device, a list of identifier sequences obtained from defined strings based on the mapping function. The computer-implemented method can also comprise: applying, by the device, the mapping function to a queried string to obtain a queried identifier sequence; and determining, by the device, whether the queried string is a homographic string by comparing the queried identifier sequence with the list of identifier sequences.

Another embodiment comprises a computer-implemented method. The computer-implemented method can comprise: obtaining, by a device operatively coupled to a processor, an input list of pairs of confusable characters; and generating a plurality of groups assigned respective identifiers such that two or more characters appearing in the input list of pairs of confusable characters together with each other at least once in a pairwise manner belong to a same group and the plurality of groups generated are mutually exclusive.

Another embodiment comprises a computer system. The computer system can comprise: a memory that stores computer executable components; and a processor, operably coupled to the memory, and that executes the computer executable components stored in the memory, wherein the computer executable components comprise: at least one computer-executable component that: prepares a mapping function that maps a character into an identifier, wherein the mapping function defines a plurality of groups each including two or more characters that resemble one another assigned the same identifier and the plurality of groups are mutually exclusive; prepares a list of identifier sequences obtained from defined strings based on the mapping function; applies the mapping function to a queried string to obtain a queried identifier sequence; and determines whether the queried string is a homographic string by comparing the queried identifier sequence with the list of identifier sequences.

Another embodiment comprises a computer system. The computer system can comprise: a memory that stores computer executable components; and a processor, operably coupled to the memory, and that executes the computer executable components stored in the memory, wherein the computer executable components comprise: at least one computer-executable component that: obtains an input list of pairs of confusable characters; and generates a plurality of groups assigned respective identifiers such that two or more characters appearing in the input list of pairs of confusable characters together with each other at least once in a pairwise manner belong to the same group and the groups generated are mutually exclusive.

Another embodiment comprises a computer program product for detecting a homographic string against defined strings, the computer program product comprising a computer readable storage medium having program instructions embodied therewith. The program instructions can be executable by a processor to cause the processor to: prepare, by the processor, a mapping function to map a character into an identifier, the mapping function defining a plurality of groups each comprising two or more characters that resemble one another assigned the same identifier and the plurality of groups being mutually exclusive; and prepare, by the processor, a list of identifier sequences obtained from defined strings based on the mapping function. The program instructions can be executable to also cause the processor to: apply, by the processor, the mapping function to a queried string to obtain a queried identifier sequence; and judge, by the processor, whether the queried string is a homographic string by comparing the queried identifier sequence with the list of the identifier sequences.

Computer systems and computer program products relating to one or more embodiments are also described and claimed herein.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

One or more embodiments are directed to computer-implemented methods, computer systems and computer program products that detect a homographic string against defined strings, in which the homographic string can be a homograph domain name and the defined strings can be listed valid domain names. One or more other embodiments are directed to computer-implemented methods, computer systems and computer program products that build a mapping function used for mapping a character into an identifier to obtain an identifier sequence having a canonical form from a given string, in which the given string can be a queried or valid domain name used for the homograph domain name detection. One or more present embodiments relate generally to detection technology of homographic strings and, more particularly, to detection of a homographic string and a building of a mapping function for detection of a homographic string.

A domain name is an identification string defining an area of administrative authority in the Internet. The domain names are formed according to the Domain Name System (DNS). The DNS is a notable technology not only from a viewpoint of aliases for IP (Internet Protocol) addresses, but also from a perspective of trust. The domain names act as a source of trust, not only for computers but also for humans. Visually perceiving an address bar or something that shows the domain name provides users with such trust. However, this is where a homograph attack exploits. The homograph attack is a type of domain abuse where an attacker registers a domain name visually similar to a target domain.

There have been a number of homograph domain detection technologies so far. Advanced web browsers can include built-in protection to mitigate homograph attacks. Some technology can be deployed in the existing browsers and require no change in the way the end-user interact with the web-browsers. However, mitigation technologies for homograph attack are limited and can have pitfalls. For example, the technology may not detect homograph attacks based on homoglyphs among non-ASCII characters. Also, the possibility of a homograph domain name that consists only of Cyrillic characters has been identified. Even though there is some technique for mitigating homograph attack that supports some Unicode mapping, such methodology is adhoc and is far from comprehensive.

Now, referring to a series of FIGS. 1-6, a homograph domain attack detection computer system, a computer-implemented method and a computer program product that detects a homograph domain name against listed valid domain names and a method that builds a mapping function that can be used to detect the homograph domain name are described.

Figure 1:
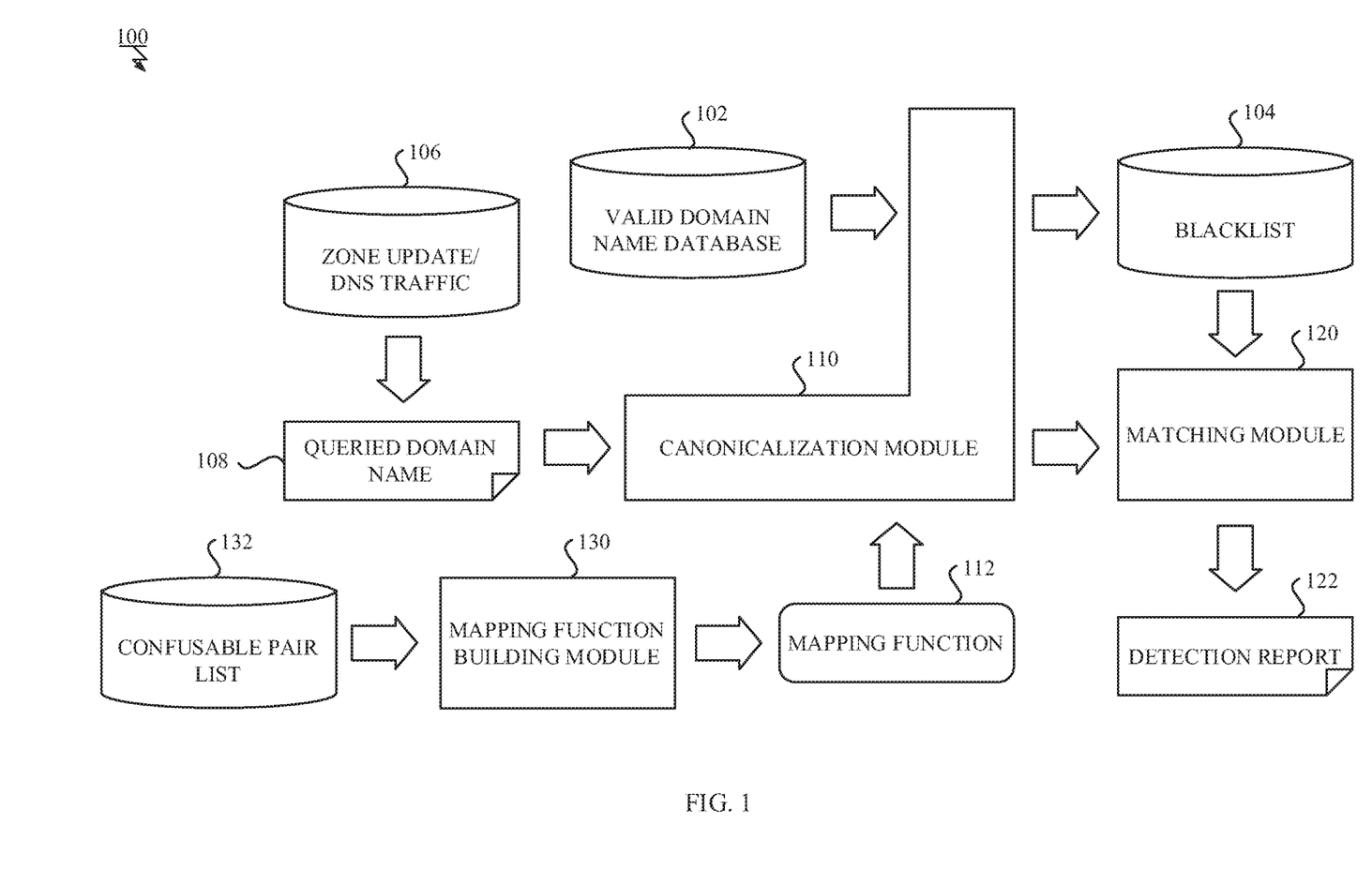
FIG. 1 illustrates a block diagram of a homograph domain attack detection system for detecting a homograph domain name against listed valid domain names in accordance with one or more embodiments described herein.

FIG. 1 illustrates a block diagram of a homograph domain attack detection system (hereinafter, simply referred to as "detection system") 100. As shown in FIG. 1, the detection system 100 includes a valid domain name database 102 that provides valid domain names whose visually similar domain names should be detected; a zone update/DNS traffic 106 that provides a domain name (hereinafter, referred to as "queried domain name") 108 to be detected as to whether or not it is any homograph domain name against the listed valid domain names; a canonicalization model 110 that transforms a given domain name, which is either the queried domain name 108 or a listed valid domain name provided by the valid domain name database 102, into its canonical form; and a matching module 120 that judges whether the queried domain name 108 is a homograph domain name or not by comparing the queried domain name 108 and the listed valid domain names in the canonical forms.

The canonicalization model 110 can transforms a given domain name into an identifier sequence by using a defined mapping function 112. The canonicalization model 110 can prepare the mapping function 112 on a working memory when the detection system 100 starts up and output an identifier sequence based on the mapping function 112 in response to an input of a given domain name.

The canonicalization model 110 is used in both of the following phases: a list preparation/update phase where a blacklist 104 for detecting homograph domain names is prepared or updated based on the valid domain names provided by the valid domain name database 102; and a detection phase where a determination is made as to whether the queried domain name 108 is a homograph domain name or not. Thus, the input for the canonicalization model 110 can be either the queried domain name 108 or one of the listed valid domain names stored in the valid domain name database 102.

The mapping function 112 can be used by the canonicalization model 110 in both the list preparation/update phase and the detection phase to obtain an identifier sequence for the given domain name. The mapping function 112 can map a character into a corresponding identifier. Thus, by inputting the given domain name, which is a sequence of characters (i.e., a string), into the mapping function 112, a sequence of identifiers are output from the mapping function 112. The identifier sequence can be considered as a canonical form of the given domain name.

The mapping function 112 can define a plurality of visually similar character groups. In some embodiments, each of the plurality of visually similar character groups includes two or more characters that resemble one another. The groups are assigned with respective identifiers and thus the characters belonging to one group are assigned with the same identifier that is assigned to the group. The mapping function 112 can also define one or more single characters (or a single character group containing only one character) assigned with respective identifiers, each of which can be a character that does not resemble any other characters.

The identifier can be any one of numbers, characters, strings, etc. as long as it can uniquely identify the group. In a particular embodiment, the identifier is a representative character that is one of the members in the group.

The plurality of the groups is defined such that the groups are mutually exclusive. In an embodiment, the plurality of the groups is also defined such that an uppercase and a lowercase of the same letter belong to the same group. In a further embodiment, the plurality of the groups is further defined such that a character represented by a base character with a combining character belongs to the same group as the base character belongs to. In a particular embodiment, the plurality of the groups includes not only American Standard Code for Information Interchange (ASCII) characters but also Unicode characters. A union of the groups can comprise or covers at least a part of the character set of Unicode, and a union of the character groups that resemble one another with single characters or single character groups can comprise or cover the entire character set of Unicode.

During the list preparation/update phase, the canonicalization model 110 can prepare the blacklist 104 by inputting, into the mapping function 112, each listed valid domain name stored in the valid domain name database 102. The valid domain name database 102 can store valid domain names as a whitelist in a sense that entities on the list are accepted as legitimate. The valid domain name database 102 can be provided as a form of zone files or lists of popular domains (such as Alexa Top 1M provided by Alexa Internet, Inc.). Note that the zone file can be a text-based file describing Domain Name system (DNS) zone, which is a distinct, contiguous portion of the name space in the DNS for which administrative responsibility is delegated. The zone files can be obtained from registries. The lists of the popular domains can be also obtained from existing providers. The blacklist 104 prepared can include a list of identifier sequences, each of which is obtained from one of the listed valid domain names stored in the valid domain name database 102. The blacklist 104 is a blacklist in a sense that an entity matching one on the list would be avoided or distrusted as not being acceptable as legitimate.

During the detection phase, the canonicalization model 110 can apply the mapping function 112 to the queried domain name 108 to obtain a queried identifier sequence. The queried domain name 108 can be provided in a form of the zone update/DNS traffic 106. The zone update can be obtained from the registries or can be requested with Centralized Zone Data Service (ICANN). The DNS traffic can be fetched passively by using a world-wide DNS platform. Alternatively, the queried domain name 108 can be obtained as difference between old and updated lists of popular domains obtained from providers. Note that any input source of new domain names can be acceptable.

The matching module 120 can judge/determine whether the queried domain name 108 is a homograph domain name against the listed valid domain name or not by comparing the queried identifier sequence with the blacklist 104, that is the list of the identifier sequences. When the queried identifier sequence appears in the blacklist 104, it is determined that the queried domain name 108 is the homograph domain name. The way of comparing the queried identifier sequence with the list of the identifier sequences will be described later in more detail.

The result judged for the given queried domain name 108 is output by the matching module 120 as a detection report 122. The detection report 122 can include the result of the judgement as to whether or not the queried domain name 108 is detected as the homograph domains against the listed valid domain names.

As shown in FIG. 1, the detection system 100 can further include a confusable pair list 132 that is one or more lists of pairs of confusable characters; and a mapping function building module 130 that builds the mapping function 112 by using the confusable pair list 132. There can be an additional phase before the list preparation/update phase and the detection phase: that is a function building phase where the mapping function building module 130 operates.

The confusable pair list 132 can be any list that holds the relationship of confusable characters, which can include, but not limited to, "confusable.txt" ([Online] Available: https://www.unicode.org/Public/security/latest/confusables.txt) and "homoglyphs.net" ([Online] Available: http://homoglyphs.net/).

During the function building phase, the mapping function building module 130 can build the mapping function 112 by generating a set of groups such that two or more characters that appear in the confusable pair list 132 together with each other at least once in a pairwise manner belong to the same group and the groups generated are mutually exclusive. The way of building the mapping function 112 will be described later in more detail In particular embodiments, each of the modules 110, 112, 120 and 130 in the detection system 100 shown in FIG. 1 can be implemented as a software module including program instructions and/or data structures in conjunction with hardware components such as a processing circuitry (e.g., a CPU (Central Processing Unit), a GPU (Graphic Processing Unit), a FPGA (Field Programmable Gate Array)), a memory, etc.; as a hardware module including electronic circuitry (e.g., a neuromorphic chip); or as a combination thereof.

These modules 110, 112, 120, and 130 shown in FIG. 1 can be implemented on a single computer system such as a personal computer and a server machine, or a computer system distributed over a plurality of computing devices such as a computer cluster of computing nodes, a client-server system, a cloud computing system, an edge computing system, etc.

In an embodiment, the canonicalization model 110, the mapping function 112, the matching module 120 and the blacklist 104 can be implemented on a server side computer system. Storing the blacklist 104 on the server side makes the blacklist 104 easily updatable with smaller restrictions regarding its size and smaller operational cost. The detection of the homograph domain name can be performed at the time of registration using the zone updates of the zone files or at any time with the passive DNS techniques.

However, the way of implementation need not be limited to the specific previous embodiments described herein. In other embodiments, the canonicalization model 110, the mapping function 112, the matching module 120 and the blacklist 104 can be implemented on a client side machine. Since whether the queried domain name 108 is the homograph domain name or not can be determined by checking the existence of the same identifier sequence in the blacklist 104, the blacklist 104 can be implemented lightweight. Thus, the performance degradation and the memory occupation due to blacklist 104 can be minimized even though the blacklist 104 is stored on the client-side machine. In this case, the detection of the homograph domain name can be performed when access to the requested domain name is invoked on the client side such as browser.

Figure 2:
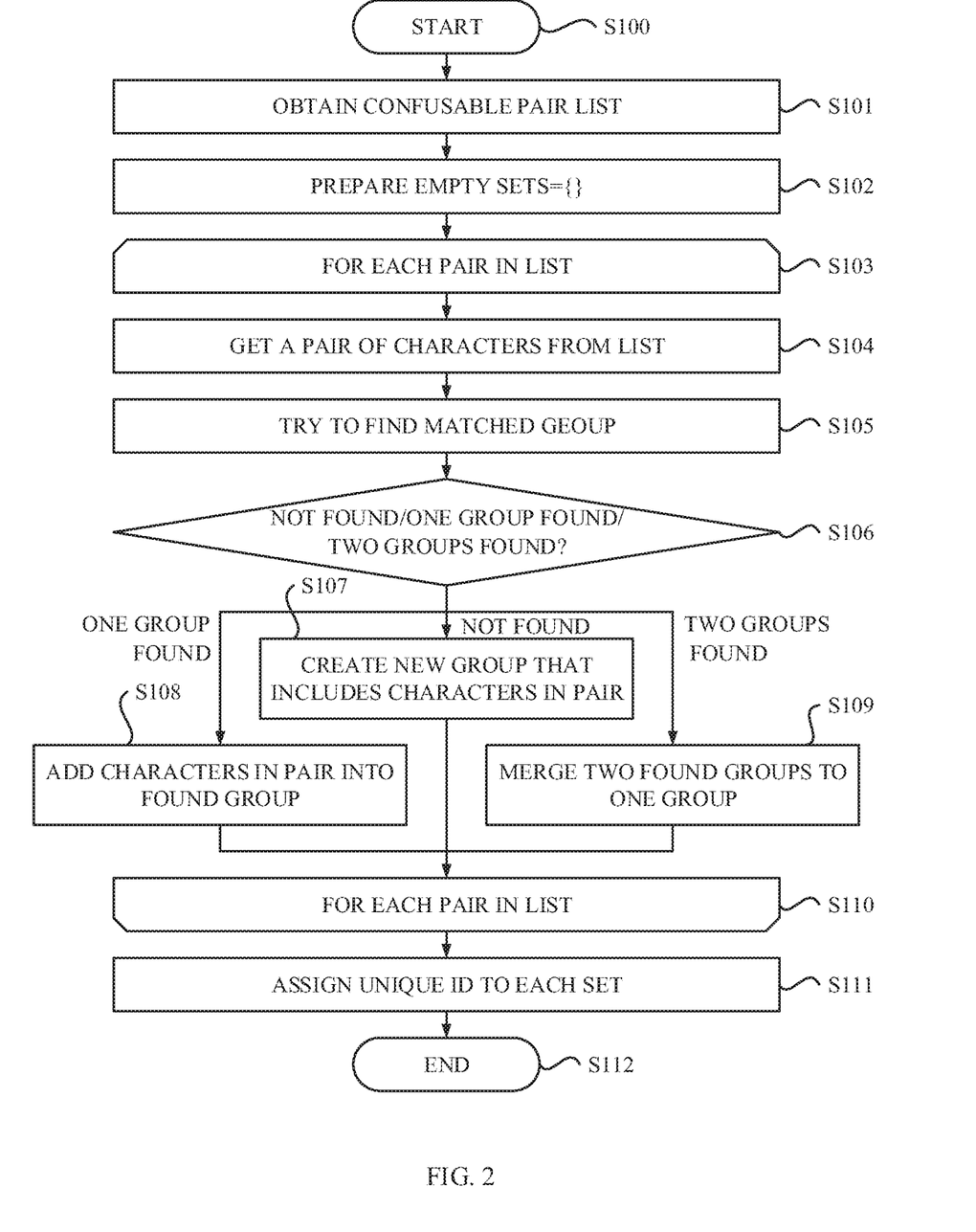
FIG. 2 illustrates a flowchart depicting a process that builds a mapping function in accordance with one or more embodiments described herein.

With reference to FIG. 2, a process that builds a mapping function in accordance with one or more embodiments is described. Note that the process shown in FIG. 2 can be performed by processing circuitry such as a processor or processing unit that implements the mapping function building module 130 of the detection system 100 shown in FIG. 1. The process can begin at step S100 in response to a request for building a mapping function with a designation of a confusable pair list 132 under analysis.

At step S101, the processing circuitry can obtain the confusable pair list 132 including pairs of confusable characters, which can be stored on a local storage or a network location.

At step S102, the processing circuitry can prepare an empty set, SETS{ }, to which newly created groups of characters that resemble one another would be added. The processes from step S103 to step S110 can be performed for each pair in the confusable pair list 132. The confusable pair list 132 can retain the confusable characters in a pairwise manner.

At step S104, the processing circuitry can get a pair of characters to be processed from the confusable pair list 132.

At step S105, the processing circuitry can try to find a group matched to the pair. The matched group is a group to which at least one of the confusable characters in the pair belongs, a group to which a uppercase or a lowercase of at least one of the confusable characters in the pair belongs and/or a group to which a base character of at least one of the confusable characters in the pair belongs when one or more of the confusable characters is represented by the base character with other combining character.

At step S106, the process can branch in a manner depending on the result obtained at step S105. In response to no matched group being found in the set, SETS, the process can branch to step S107. At step S107, the processing circuitry can create a new group including the confusable characters in the pair and add the new group into the set, SETS.

In response to one matched group being found in the set SETS, the process can branch to step S108. At step S108, the processing circuitry can add the confusable characters in the pair into the one matched group, if necessary. If one or both of the confusable characters is matched to the one group, addition of the matched confusable character(s) can be omitted.

In response to a plurality of matched groups being found in the set, SETS, the process can branch to step S109. At step S109, the processing circuitry can merge the plurality of matched groups into one group and delete another remaining group (e.g., one that is merged into a resultant group).

By performing the processes from step S103 to step S110 for every pair in the confusable pair list 132, a plurality of mutually exclusive groups each including one or more characters that resemble one another can be generated.

Figure 3:
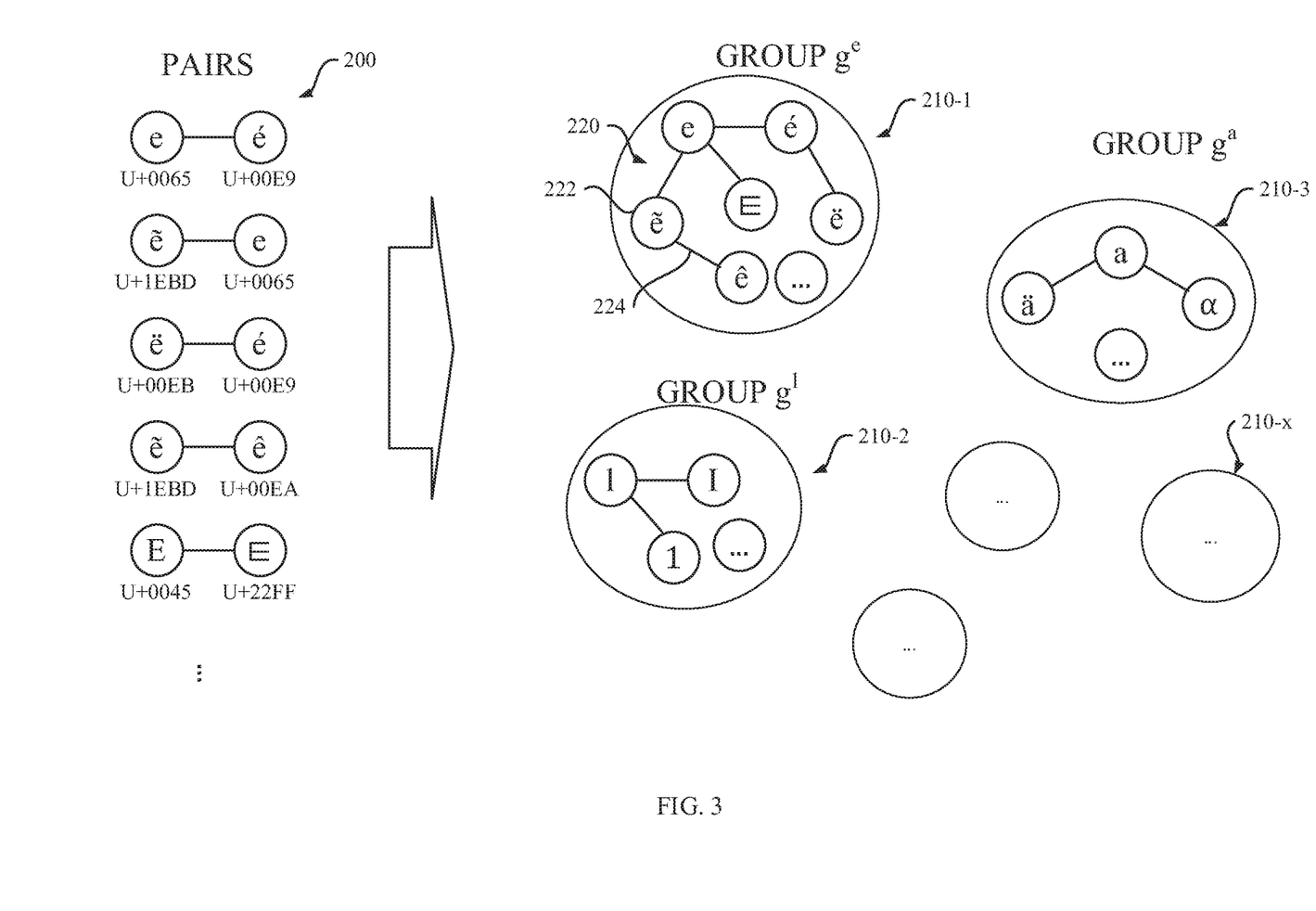
FIG. 3 illustrates a way of building the mapping function in accordance with one or more embodiments described herein.

With reference to FIG. 3, a way of building the mapping function is described in more detail.

In the embodiment, the plurality of the groups H[i] (i=1, 2, . . . ; i is an index of groups) are defined such that the groups are mutually exclusive, as indicated by the following condition:

$$H[i] \cap H[j] = \emptyset,$$

where j denotes an index different from the index i. This condition can guarantee that a given string is uniquely converted to an identifier sequence.

In an embodiment, the groups H[i] are also defined such that an uppercase and a lowercase of the same letter belong to the same group, as indicated by the following condition:

$$\text{lowercase}(x) \in H[i] \Leftrightarrow \text{uppercase}(x) \in H[i],$$

where the function lowercase(x) and the function uppercase(x) outputs lowercase and uppercase of an input character x if it is not that case, respectively.

This condition can force both the uppercase and lowercase forms of x to be mapped to the same character, thereby resolving the problem with the skeleton. The homograph domain name including a special character would be missed in conventional techniques based on the skeleton, For example, when "○" (U+3007) is mapped to "O" (U+004F) but "O" is not mapped to "o" (U+006F) in the confusable pair list 132, skeleton(○(U+3007))=! skeleton (o). In this case, the homograph domain name including the character "○" (U+3007) instead of the character "o" (U+006F) cannot be detected although the former is also allowed to be used in IDN (e.g. for the ccTLD .jp). By satisfying this condition, homograph domain names including a special character that would be missed in the conventional technique based on the skeleton can also be detected.

In further embodiment, the groups Mil are further defined such that characters (x+c) represented by a base character (x) with combining characters (c) belongs to the same group as that the base character (x) belongs to, as indicated by the following condition:

$$x \in H[i] \Leftrightarrow (x+c) \in H[i],$$

where the character (x+c) denotes a precomposed character (NFD (Normalization Form canonical Decomposition)) represented by a base character (x) followed by a combining character (c).

In an embodiment, the groups include not only ASCII characters but also Unicode characters. A union of the groups would cover at least a part of character set of Unicode. More specifically, a union of the resemble character groups with single characters or single character groups can cover an entirety of the character set of Unicode.

As illustratively shown in FIG. 3, there are several confusable pairs 200, each of which can comprise or consist of two confusable characters: "e" (U+0065) and "é" (U+00E9); "ê" (U+1EBD) and "e" (U+0065); "ë" (U+00EB) and "é" (U+00E9); "ê" (U+1EBD) and "ê" (U+00EA); and "E" (U+0045) and "E" (U+22FF).

During the process shown in FIG. 2, the groups H[i] are generated such that two or more characters that appear in the confusable pair list 132 together with each other at least once in a pairwise manner belong to the same group. Thus, the characters "é" (U+00E9) and "ê" (U+1EBD) belong to the same group 200-1 ($g^e$) since they appear together with the character "e" (U+0065) in pairwise manner respectively even if there is no explicit pair of "é" (U+00E9) and "ê" (U+1EBD). In this way, the characters "é" (U+00E9), "ê" (U+1EBD), "ë" (U+00EB), "ê" (U+00EA), etc. are organized into the group 200-1 ($g^e$) as a graph 220 consisting of characters as nodes 222 and the co-occurrence relations as edges 224 being evolved. Note that the characters "e" (U+0065) and "ê" (U+1EBD) are organized into the same group 200 even if there is no explicit pair or implicit relation of the characters "e" (U+0065) and "ê" (U+1EBD) appear in the confusable pair list 132, since the character "ê" (U+1EBD) can be represented by the base character "e" (U+0065) and the combining character tilde "~".

Since the lowercase of the character "E" (U+0045) is the character "e" (U+0065), the character E (U+22FF) that appears with the uppercase of the character "e" (U+0065) also belongs to the same group 200-1 ($g^e$) as the character "e" (U+0065) belongs to. The same can holds for other groups 210-2~210~x. Also, there can be one or more single characters (or a single character group containing only one character) assigned with respective identifiers, each of which can be such a character that does not appear in the confusable pair list 132.

Note that not all lowercases and uppercases will appear in the confusable pair list 132. Thus, in a particular embodiment, pairs of lowercase and uppercase can be enumerated as an additonal confusable pair lsit 132. Alternatively, preprocess that converts the lowercase or the uppercase into the same character can be added into the mapping function. Also note that not all possible precomposed characters will appear in the confusable pair list 132. Hence, in one embodiment, the sets of possible precomposed characters having the same base character in common can be enumerated as an additonal confusable pair lsit 132. Alternatively, preprocess that converts the precomposed character into its base character can be added into the mapping function.

Referring back to FIG. 2, after performing the processes from step S103 to step S110 for every pair in the designated confusable pair list 132, the process can proceed to step S111. At step S111, the processing circuitry can assign an identifier to each group in the set, SETS and the process can end at step S112.

Figure 4:
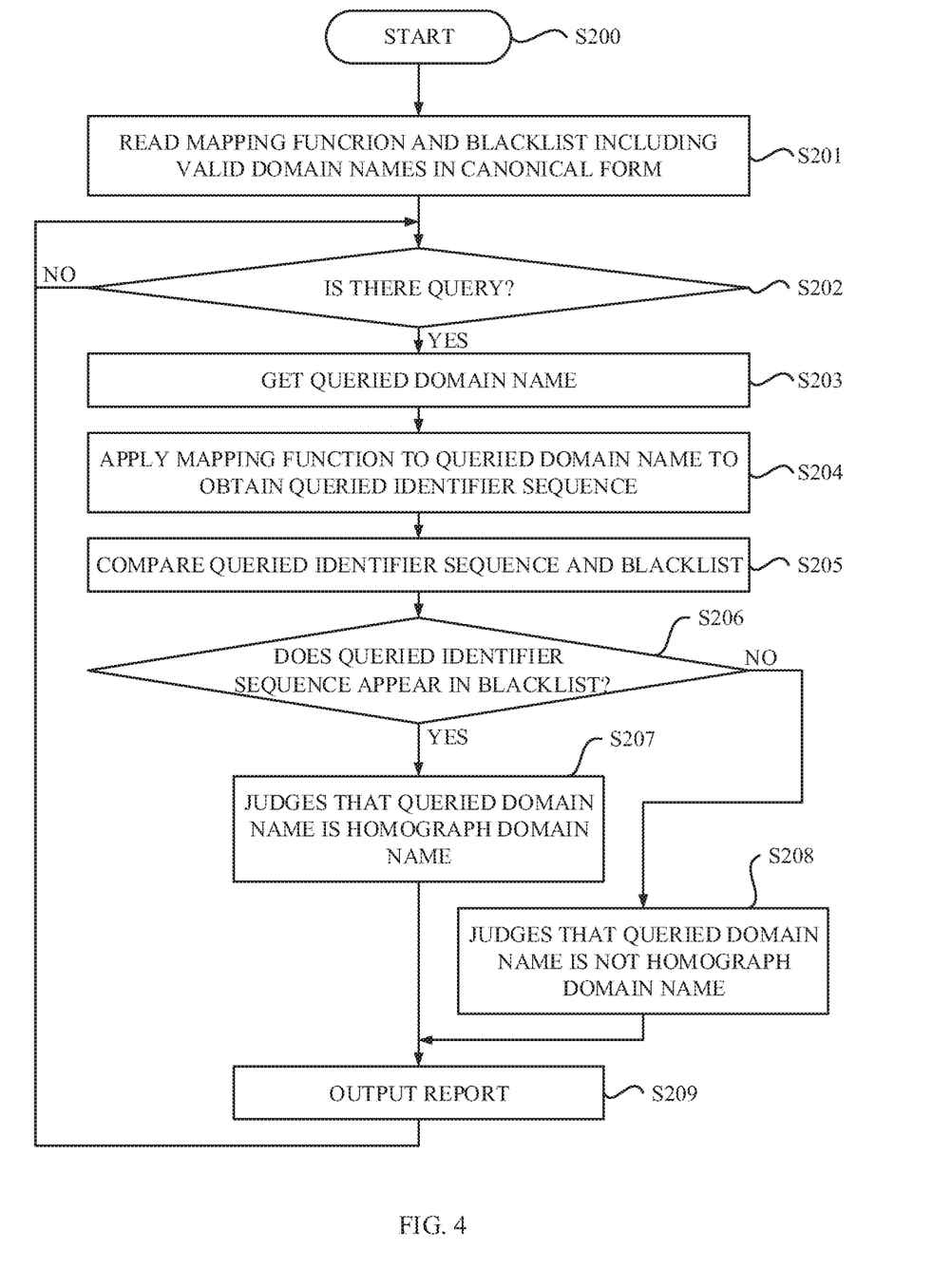
FIG. 4 illustrates a flowchart depicting a process that detects a homograph domain name against listed valid domain names in accordance with one or more embodiments described herein.

With reference to FIG. 4, a process that detects a homograph domain name against listed valid domain names in accordance with one or more embodiments is described. Note that the process shown in FIG. 4 can be performed by processing circuitry such as a processor or a processing unit that implements the canonicalization model 110 and the matching module 120 of the detection system 100 shown in FIG. 1. The process shown in FIG. 4 can begin in response to entering the detection service.

At step S201, the processing circuitry can read the mapping function 112 and the blacklist 104 that includes the valid domain names in their canonical forms. The blacklist 104 is a list of identifier sequences that has been obtained from the listed valid domain names based on the same mapping function 112 during the list preparation/update phase.

At step S202, the processing circuitry can determine whether there is a new query or not. If it is determined that there is no new query yet in step S202 (NO), the process can loop back to step S202. On the other hand, if it is determined that there is a new query in step S202 (YES), the process can proceed to step S203.

At step S203, the processing circuitry can get a queried domain name 108 that can be included in the query. At step S204, the processing circuitry can apply the mapping function 112 to the queried domain name 108 (more correctly to each character in the string of the queried domain name 108) to obtain the queried identifier sequence. At step S205, the processing circuitry can compare the queried identifier sequence with the blacklist 104. At step S206, the process can branch in a manner depending on whether the queried identifier sequence appears in the blacklist 104 or not.

Figure 5:
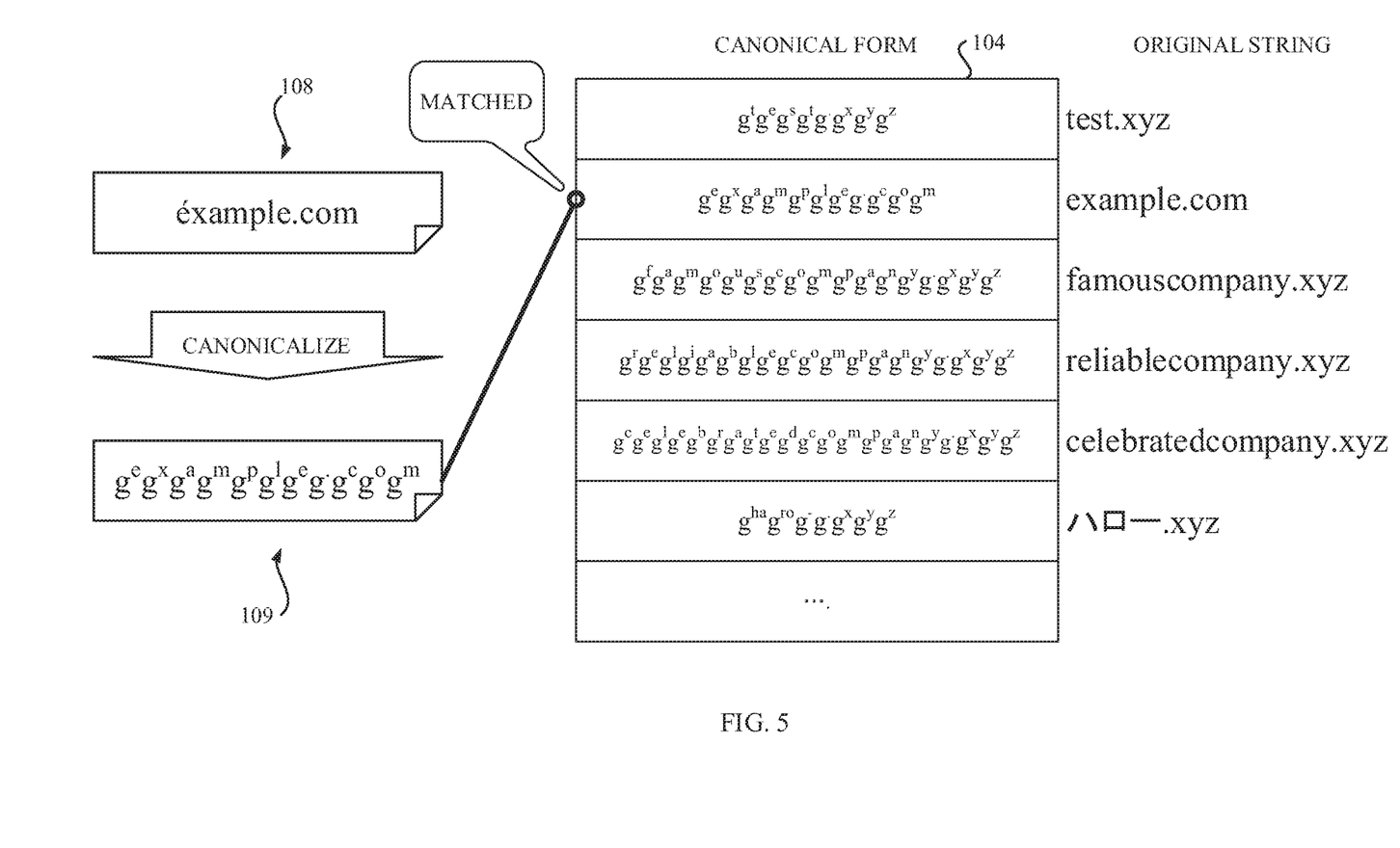
FIG. 5 illustrates a process to detect a homograph domain name against listed valid domain names in accordance with one or more embodiments described herein.

With reference to FIG. 5, a way of detecting a homograph domain name against listed valid domain names is described in more detail. Note that the strings shown as the valid domain names in FIG. 5 are fictitious names for convenience of description. As shown in FIG. 5, the queried domain name 108 is first canonicalized by the canonicalization model 110 based on the mapping function 112 into a canonical form, which is a queried identifier sequence 109. Also there is the blacklist 140 including valid domain names having canonical forms, which are the identifier sequences obtained based on the mapping function 112 from the valid domain names stored in the valid domain name database 102. In FIG. 5, there are several identifier sequences with their original string forms (right hand side). The blacklist 104 can be implemented as a hash table that can map keys to values. If there is the exact same identifier sequence as the queried identifier sequence 109 in the blacklist 104, it is determined that the queried identifier sequence 109 appears in the blacklist 104. In the example shown in FIG. 5, the canonical form of the domain name "éxample.com" (the first character is Latin small letter "e" with an acute accent) can found in the blacklist 104, which includes the canonical form of the valid domain name "example.com" (the first character is Latin small letter "e" without an acute accent). There is an identical entity on the blacklist 104 that matches to the queried identifier sequence 109.

Referring back to FIG. 4, if it is determined that the queried identifier sequence 109 appears in the blacklist 104 in step S206 (YES), the process can branch to step S207. At step S207, the processing circuitry can judge/determine that the queried domain name 108 is a homograph domain of at least one of the listed valid domain names and the process can proceed to step S209.

On the other hand, if it is determined that the queried identifier sequence does not appear in the blacklist 104 in step S206 (NO), the process can branch to step S208. At step S208, the processing circuitry can judge/determine that the queried domain name 108 is not any homograph domain of the listed valid domain names, and the process can proceed to step S209.

At step S209, the processing circuitry can output the result of the judgement/determination as a detection report 122 and the process can loop back to step S202 for another query.

With reference to FIGS. 6A, 6B, 6C and 6D, examples of detectable homograph domain names are described. Note that the strings shown as the valid domain names in FIGS. 6A, 6B, 6C and 6D are also fictitious names for convenience of description.

Figure 6A:
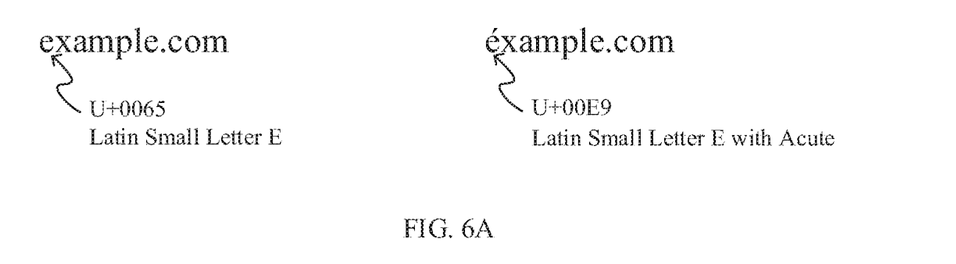
FIGS. 6A, 6B, 6C and 6D depicts examples of detectable homograph domain names in accordance with one or more embodiments described herein.

FIG. 6A shows a homograph domain name "éxample.com" (the first character is Latin small letter "e" with an acute accent instead of Latin small letter "e") against a valid domain name "example.com". This is an example of visually similar domain names including homoglyphs between ASCII characters and other characters.

Figure 6B:
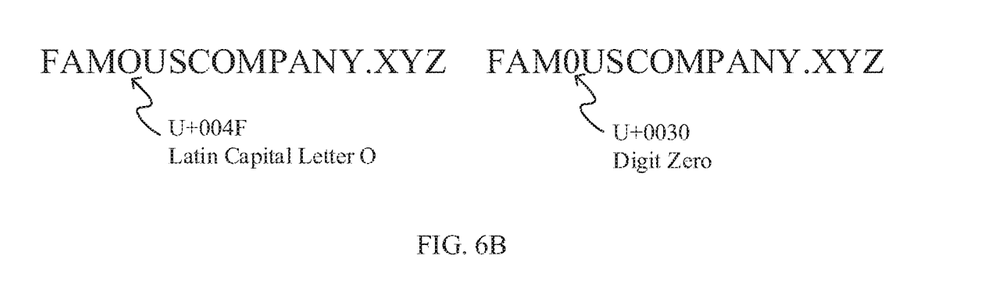

FIG. 6B shows a homograph domain name "FAM0USCOMPANY.XYZ" (the fourth character is digit zero instead of Latin capital letter "O") against a valid domain name "FAMOUSCOMPANY.XYZ". This is an example of visually similar domain names including homoglyphs within ASCII characters.

Figure 6C:
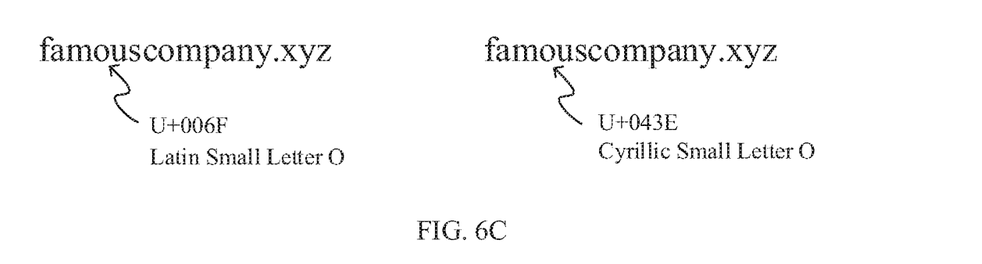

FIG. 6C shows a homograph domain name "famouscompany.xyz" (the fourth character is Cyrillic small letter "O" instead of Latin small letter "O") against a valid domain name "famouscompany.xyz". This is an example of visually similar domain names including homoglyphs between ASCII characters and other characters. Most users cannot distinguish "о" (U+043E) with "o" (U+006F).

Figure 6D:
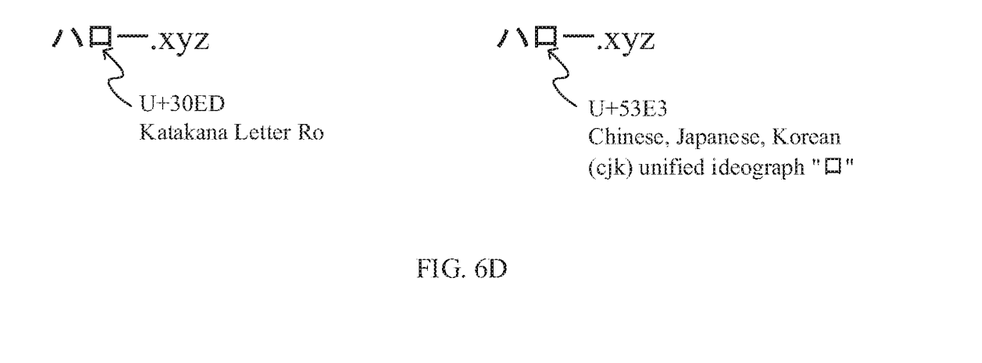

FIG. 6D shows a homograph domain name "ハ口ー.xyz" (the first character is Katakana Letter Ha (U+30CF), the second character is CHJ unified ideograph "口" (U+53E3) instead of katakana letter Ro(U+30ED) and the third character is a katakana/hiragana prolong sound mark (U+30FC) against a valid domain name "ハロー.xyz". This is an example of visually similar domain names including homoglyphs within Unicode characters other than ASCII ones.

According to one or more embodiments, a novel technology capable of detecting a homographic string in more comprehensive and efficient manner can be provided.

In terms of efficiency, let us suppose d as a queried domain name, L is a blacklist, and canonicalize(d) is an identifier sequence obtained from d, which can be calculated by a function comprises or consists of the aforementioned mapping function with time complexity $O(n)$ (n is a length of d). This is not an issue because n can be 63 or less for the domain name. With regard to the determination as to whether or not canonicalize(d)∈L has time complexity O(1) and space complexity O(n) (n is the size of L), there is no need to compare the canonicalize(d) with all the entries in the blacklist L, in contrast to cases where sophisticated calculation such as similarity calculation between a target and each entity in the blacklist are required. The blacklist 104 can be implemented as a hash table, which is a lightweight data structure as one solution for finding an exact match.

The novel homograph domain name detection functionality can be used solely or in combination with other techniques that analyzes the detected domains in some ways, which can be too heavy to deal with all the daily records. Content-based analysis to detect junk electronic mail and and other methods including one based on term frequency-inverse document frequency (TF-IDF) scores and one based on image captures of webpages can be contemplated.

In one or more embodiments wherein the homographic string is a homograph domain name and the defined strings are valid domain names, a homograph attack can be prevented and a risk of inappropriate email schemes can be reduced, which are concerns in the field of the network security.

In the embodiment where the mapping function is defined such that an uppercase and a lowercase of the same letter belongs to the same group, homographic strings including a special character that would be missed in old techniques based on the skeleton can also be detected.

In the embodiment where the mapping function is defined such that a character represented by a base character with a combining character belongs to the same group as the base character belongs to, the queried string including a character represented by a base character and a combining character can be detected without omissions since almost all cases of combined characters looks like the base character.

In the other embodiments wherein the plurality of the groups includes Unicode characters and a union of the plurality of the groups includes at least a part of a character set of Unicode, homograph domain names in which ASCII characters are replaced with similar Unicode ones and Unicode characters are replaced with Unicode ones can be detected.

Note that one or more embodiments has been described in a context of homograph domain name detection. However, the problem of homographic strings can arise in other fields. Thus, the novel homographic string detection technologies described herein can be applicable to fields other than the network security.

EXPERIMENTAL STUDIES

A program implementing the mapping function building module 130 of the detection system 100 in FIG. 1 and the process shown in FIG. 2 according to an embodiment was coded and executed for given confusable pair lists. "confusables.txt" and "homoglyphs.net" were used as sources of homoglyphs to build the mapping function 112.

Also a program implementing the canonicalization model 110 of the detection system 100 in FIG. 1 was coded and executed for a given valid domain names to generate the blacklist 104. Alexa Top 1 million domain names were used as the valid domain names.

Furthermore, a program implementing the modules 110, 120 of the detection system 100 in FIG. 1 and the process shown in FIG. 4 according to an embodiment was coded and executed for given domain name feeds. The domains names observed on Quad9 were taken as new domain feeds. Note that the DNS data obtained from Quad9 does not contain Personally Identifiable Information (PII). Around 1 million unique DNS records per day were taken from Quad9.

Figure 7A:
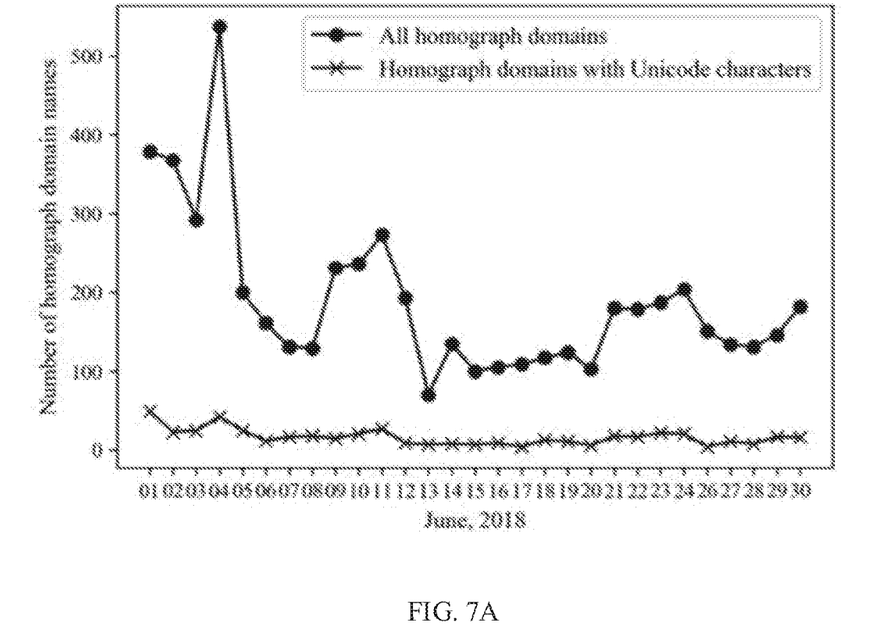
FIGS. 7A and 7B depict graphs showing daily count of homograph domain names and a graph showing distribution of n of unique homograph domain names that are found in DNS traffic against Alexa 1 million domains, respectively, by using the detection process in accordance with one or more embodiments described herein.

FIG. 7A is a graph showing daily count of homograph domain names that are found in DNS traffic against the Alexa Top 1 million domains. The novel detection functionality detected 189 homograph domain names for an average 939,000 unique domains input per day. In total, 4476 unique homograph domain names were observed in June 2018. 415 homograph domains of them (about 9%) included at least one Unicode characters. This result shows that the target of homograph attacks is not only specific popular domains like those in the Alexa Top 1000 but also the wider area of the whole registered domains.

Figure 7B:
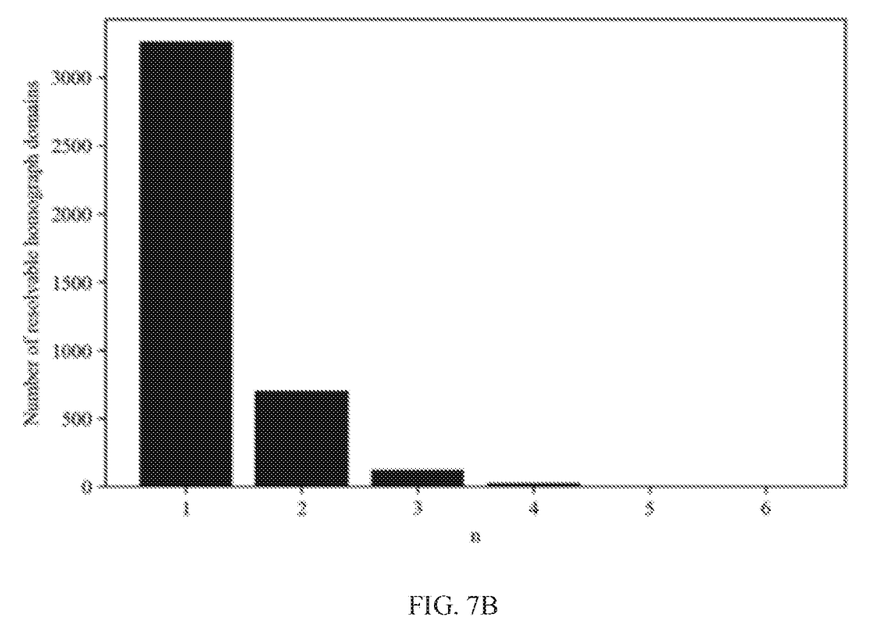

FIG. 7B is a graph showing distribution of n of unique homograph domain names that are found in DNS traffic against Alexa 1 million domains. Note that n represents how many characters in a homograph domain name are different from the corresponding legitimate domain. As shown in FIG. 7B, the number of homograph domain names decreases as n increases. This result indicates that those who register homograph domain names prefer to replace only a few characters from legitimate domains. These findings suggest that it is able to crawl a large area of existing homograph domain names by covering the cases of n=1, 2, which helps active monitoring.

Computer Hardware Component

Figure 8:
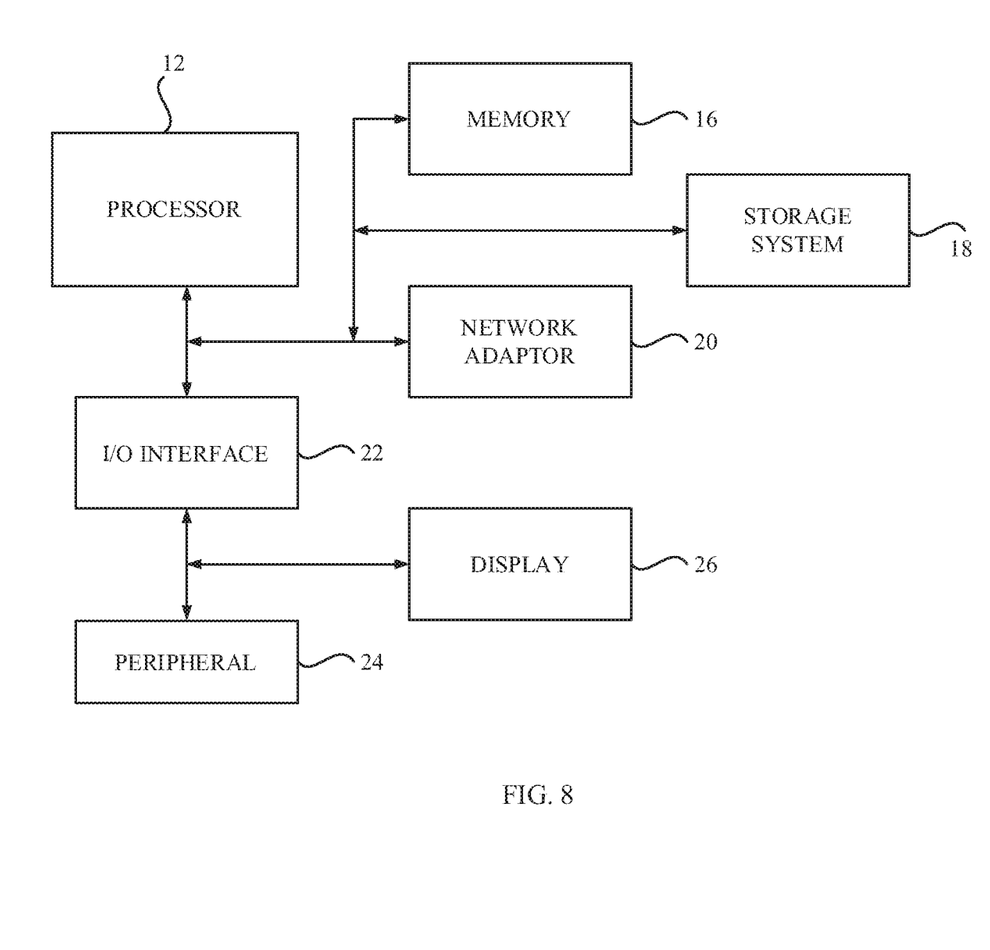
FIG. 8 depicts a computer system according to one or more embodiments of the present invention.

Referring now to FIG. 8, a schematic of an example of a computer system 10, which can be used for the detection system 100, is shown. The computer system 10 shown in FIG. 8 is implemented as computer system. The computer system 10 is only one example of a suitable processing device (e.g., processor) and is not intended to suggest any limitation as to the scope of use or functionality of embodiments of the invention described herein. Regardless, the computer system 10 is capable of being implemented and/or performing any of the functionality set forth hereinabove.

The computer system 10 can be operational with numerous other general purpose or special purpose computing system environments or configurations. Examples of well-known computing systems, environments, and/or configurations that can be suitable for use with the computer system 10 include, but are not limited to, personal computer systems, server computer systems, thin clients, thick clients, hand-held or laptop devices, in-vehicle devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 10 can be described in the general context of computer system-executable instructions, such as program modules, being executed by a computer system. Generally, program modules can include routines, programs, objects, components, logic, data structures, and so on that perform particular tasks or implement particular abstract data types.

As shown in FIG. 8, the computer system 10 is shown in the form of a general-purpose computing device. The components of the computer system 10 can include, but are not limited to, a processor (or processing unit) 12 and a memory 16 coupled to the processor 12 by a bus including a memory bus or memory controller, and a processor or local bus using any of a variety of bus architectures.

The computer system 10 typically includes a variety of computer system readable media. Such media can be any available media that is accessible by the computer system 10, and it includes both volatile and non-volatile media, removable and non-removable media.

The memory 16 can include computer system readable media in the form of volatile memory, such as random access memory (RAM). The computer system 10 can further include other removable/non-removable, volatile/non-volatile computer system storage media. By way of example only, the storage system 18 can be provided for reading from and writing to a non-removable, non-volatile magnetic media. As will be further depicted and described below, the storage system 18 can include at least one program product having a set (e.g., at least one) of program modules that are configured to carry out the functions of one or more embodiments.

Program/utility, having a set (at least one) of program modules, can be stored in the storage system 18 by way of example, and not limitation, as well as an operating system, one or more application programs, other program modules, and program data. Each of the operating system, one or more application programs, other program modules, and program data or some combination thereof, can include an implementation of a networking environment. Program modules generally carry out the functions and/or methodologies of embodiments of the invention as described herein.

The computer system 10 can also communicate with one or more peripherals 24 such as a keyboard, a pointing device, a car navigation system, an audio system, etc.; a display 26; one or more devices that enable a user to interact with the computer system 10; and/or any devices (e.g., network card, modem, etc.) that enable the computer system 10 to communicate with one or more other computing devices. Such communication can occur via Input/Output (I/O) interfaces 22. Still yet, the computer system 10 can communicate with one or more networks such as a local area network (LAN), a general wide area network (WAN), and/or a public network (e.g., the Internet) via the network adapter 20. As depicted, the network adapter 20 communicates with the other components of the computer system 10 via bus. It should be understood that although not shown, other hardware and/or software components could be used in conjunction with the computer system 10. Examples, include, but are not limited to: microcode, device drivers, redundant processing units, external disk drive arrays, RAID systems, tape drives, and data archival storage systems, etc.

Computer Program Implementation

The present invention can be a computer system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the embodiments of the invention in the form disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    preparing, by a device operatively coupled to a processor, a mapping function to map a character into an identifier, the mapping function defining a plurality of groups each comprising two or more characters that resemble one another assigned a same identifier, and wherein the plurality of groups are mutually exclusive;
    preparing, by the device, a list of identifier sequences obtained from defined strings based on the mapping function;
    applying, by the device, the mapping function to a queried string to obtain a queried identifier sequence; and
    determining, by the device, whether the queried string is a homographic string by comparing the queried identifier sequence with the list of identifier sequences, wherein the mapping function is built by generating the plurality of the groups,
    wherein the generating the plurality of the groups comprises:
        preparing a set; and
        processing each pair in an input list of confusable characters, comprising:
            a first case wherein, in response to no matched group being found in the set, creating, into the set, a new group including the confusable characters in the pair;
            a second case wherein, in response to only one matched group being found in the set, adding the confusable characters in the pair into the one matched group; and
            a third case, wherein in response to more than one matched groups being found in the set, merging the more than one matched groups into one group and deleting other instances of the more than one matched groups, wherein combining the first case, the second case and the third case result in the mutually exclusive plurality of groups.

2. The computer-implemented method of claim 1, wherein the mapping function is defined such that an uppercase and a lowercase of a same letter belong to a same group.

3. The computer-implemented method of claim 2, wherein the mapping function is defined such that a character represented by a base character with a combining character belongs to a same group as to which the base character belongs.

4. The computer-implemented method of claim 3, wherein the plurality of the groups includes Unicode characters and a union of the plurality of the groups comprises at least a part of a set of the Unicode characters.

5. The computer-implemented method of claim 3, wherein the set is an empty set initially, wherein the mapping function is built by generating the plurality of the groups assigned respective identifiers such that two or more characters appearing in an input list of confusable characters together with each other at least once in a pairwise manner belong to a same group and the plurality of groups generated are mutually exclusive.

6. The computer-implemented method of claim 1, wherein the computer-implemented method is adapted to concurrently apply to ASCII Homoglyph, ASCII Homoglyph and combination with other characters and Unicode-to-Unicode Homoglyph domain names.

7. A computer-implemented method, comprising:
    obtaining, by a device operatively coupled to a processor, an input list of pairs of confusable characters; and generating a plurality of groups assigned respective identifiers such that two or more characters appearing in the input list of pairs of confusable characters together with each other at least once in a pairwise manner belong to a same group and the plurality of groups generated are mutually exclusive, wherein the generating the plurality of the groups comprises:
preparing a set that is empty; and
processing each pair in an input list of confusable characters, comprising:
in response to no matched group being found in the set, creating, into the set, a new group including the confusable characters in the pair;
in response to one matched group being found in the set, adding the confusable characters in the pair into the one matched group; and
in response to more than one matched groups being found in the set, merging the more than one matched groups into one group and removing other ones of the more than one matched group to avoid redundant groups.

8. The computer-implemented method of claim 7, wherein the matched group is a group to which at least one of the confusable characters in the pair belongs.

9. The computer-implemented method of claim 7, wherein the matched group is a group to which an uppercase or a lowercase of at least one of the confusable characters in the pair belongs.

10. The computer-implemented method of claim 7, wherein the matched group is a group to which a base character of at least one of the confusable characters in the pair belongs based on a determination that the at least one of the confusable characters is represented by the base character with a combining character.

11. A computer system, comprising:
a memory that stores computer executable components; and
a processor, operably coupled to the memory, and that executes the computer executable components stored in the memory, wherein the computer executable components comprise:
at least one computer-executable component that:
prepares a mapping function that maps a character into an identifier, wherein the mapping function defines a plurality of groups each including two or more characters that resemble one another assigned the same identifier and the plurality of groups are mutually exclusive;
prepares a list of identifier sequences obtained from defined strings based on the mapping function;
applies the mapping function to a queried string to obtain a queried identifier sequence; and
determines whether the queried string is a homographic string by comparing the queried identifier sequence with the list of identifier sequences, wherein the mapping function is built by generating the plurality of the groups,
wherein the generating the plurality of the groups comprises:
preparing a set; and
processing each pair in an input list of confusable characters, comprising:
in response to no matched group being found in the set, creating, into the set, a new group including the confusable characters in the pair;
in response to one matched group being found in the set, adding the confusable characters in the pair into the one matched group; and
in response to multiple matched groups being found in the set, merging the multiple matched groups into one group.

12. The computer system of claim 11, wherein the homographic string is a homograph domain name and the defined strings are valid domain names.

13. The computer system of claim 11, wherein the mapping function is defined such that an uppercase and a lowercase of the same letter belong to a same group.

14. The computer system of claim 11, wherein the mapping function is defined such that a character represented by a base character with a combining character belongs to a same group as to which the base character belongs.

15. The computer system of claim 11, wherein the mapping function is built by generating the plurality of the groups assigned respective identifiers such that two or more characters appearing in an input list of confusable characters together with each other at least once in a pairwise manner belong to a same group and the groups generated are mutually exclusive.

16. A computer program product for detecting a homographic string against defined strings, the computer program product comprising a computer readable storage medium having program instructions embodied therewith, the program instructions executable by a processor to cause the processor to:
prepare, by the processor, a mapping function to map a character into an identifier, the mapping function defining a plurality of groups each comprising two or more characters that resemble one another assigned the same identifier and the plurality of groups being mutually exclusive;
prepare, by the processor, a list of identifier sequences obtained from defined strings based on the mapping function;
apply, by the processor, the mapping function to a queried string to obtain a queried identifier sequence; and
judge, by the processor, whether the queried string is a homographic string by comparing the queried identifier sequence with the list of the identifier sequences, wherein the mapping function is built by generating the plurality of the groups,
wherein the generating the plurality of the groups comprises:
preparing a set that is initially empty and to which newly created groups of characters that resemble one another would be added; and
processing each pair in an input list of confusable characters, comprising:
in response to no matched group being found in the set, creating, into the set, a new group including the confusable characters in the pair;
in response to one matched group being found in the set, adding the confusable characters in the pair into the one matched group; and
in response to more than one matched group being found in the set, merging the more than one matched group into one group.

17. The computer program product of claim 16, wherein the homographic string is a homograph domain name and the defined strings are valid domain names.

18. The computer program product of claim 16, wherein the mapping function is defined such that an uppercase and a lowercase of the same letter belong to a same group.

19. The computer program product of claim 16, wherein the mapping function is defined such that a character represented by a base character with a combining character belongs to the same group as to which the base character belongs.

20. The computer program product of claim 16,
obtain, by the processor, an input list of pairs of confusable characters; and
generate, by the processor, a plurality of groups assigned respective identifiers such that two or more characters appearing in the input list of confusable characters together with each other at least once in a pairwise manner belong to a same group and the plurality of groups generated are mutually exclusive.

21. A computer system, comprising:
a memory that stores computer executable components; and
a processor, operably coupled to the memory, and that executes the computer executable components stored in the memory, wherein the computer executable components comprise:
at least one computer-executable component that:
obtains an input list of pairs of confusable characters; and
generates a plurality of groups assigned respective identifiers such that two or more characters appearing in the input list of pairs of confusable characters together with each other at least once in a pairwise manner belong to the same group and the groups generated are mutually exclusive, wherein generation of the plurality of the groups comprises:
preparing a set;
processing each pair in the input list of pairs of confusable characters, comprising:
in response to no matched group being found in the set, creating, into the set, a new group including the confusable characters in the pair;
in response to one matched group being found in the set, adding the confusable characters into the one matched group; and
in response to more than one matched group being found in the set, merging the more than one matched group into one group and deleting other ones of the more than one matched group.

22. The computer system of claim 21, wherein the set is initially a null set, and wherein the matched group is selected from a group consisting of: a first group to which at least one of the confusable characters in the pair belongs, a second group to which a uppercase or a lowercase of at least one of the confusable characters in the pair belongs and a third group to which a base character of at least one of the confusable characters in the pair belongs based on a determination that the at least one of the confusable characters is represented by the base character with a combining character.

* * * * *